(12) United States Patent
Kindt et al.

(10) Patent No.: US 8,782,811 B2
(45) Date of Patent: Jul. 15, 2014

(54) CLEANING STATION FOR ATOMIC FORCE MICROSCOPE

(75) Inventors: Johannes H. Kindt, Ettlingen (DE); Daniel Lyons, Goleta, CA (US); Charles Meyer, Goleta, CA (US); Russ Mead, Goleta, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 32 days.

(21) Appl. No.: 13/458,725

(22) Filed: Apr. 27, 2012

(65) Prior Publication Data

US 2012/0297510 A1 Nov. 22, 2012

Related U.S. Application Data

(60) Provisional application No. 61/480,984, filed on Apr. 29, 2011.

(51) Int. Cl.
*G01Q 90/00* (2010.01)
(52) U.S. Cl.
CPC ........................................ *G01Q 90/00* (2013.01)
USPC .......................................................... 850/63
(58) Field of Classification Search
None
See application file for complete search history.

(56) References Cited

U.S. PATENT DOCUMENTS

| 5,266,801 A | 11/1993 | Elings et al. |
| RE34,489 E | 12/1993 | Hansma et al. |
| 5,412,980 A | 5/1995 | Elings et al. |
| 7,272,983 B2 | 9/2007 | Caderas |
| 8,166,567 B2 | 4/2012 | Phan et al. |
| 8,474,060 B2 | 6/2013 | Phan et al. |
| 2008/0006083 A1 | 1/2008 | Feinstein et al. |
| 2011/0163135 A1* | 7/2011 | Herald et al. .................. 222/556 |

FOREIGN PATENT DOCUMENTS

| JP | 2000-210262 A | 8/2000 |
| JP | 2007-047107 A | 2/2007 |

* cited by examiner

*Primary Examiner* — Michael Logie
*Assistant Examiner* — Eliza Osenbaugh-Stewar
(74) *Attorney, Agent, or Firm* — Boyle Fredrickson S.C.

(57) ABSTRACT

A cleaning station for thoroughly cleaning the AFM component surfaces that are exposed to fluid during imaging of a sample supported in a fluid medium is disclosed. The cleaning station is designed to selectively expose the AFM component surfaces to cleansing agents, such as soap/detergent and water, plasma cleaning, etc., and cleaning tools, such as brushes, while protecting fluid sensitive components from exposure to the cleansing agents. The preferred embodiments are particularly beneficial for scanners in which the fluid sensitive components (actuator, sensor, connector, etc.) are integrated in the same device to which the cantilever holder is attached.

12 Claims, 10 Drawing Sheets

CLEANING STATION FOR ATOMIC FORCE MICROSCOPE

CROSS-REFERENCE TO RELATED APPLICATIONS

This application seeks priority under 35 U.S.C. §119(e) to U.S. Provisional Patent Application Ser. No. 61/480,984, filed on Apr. 29, 2011, the entirety of which is expressly incorporated by reference herein.

BACKGROUND OF THE INVENTION

1. Field of the Invention

The present invention is directed to scanning probe microscopy in fluid, and more particularly, to an apparatus for cleaning the fluid exposed surface of a scanning probe microscope while protecting fluid sensitive components.

2. Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 1. An AFM 2 employs a probe device 3 including a probe 3 having a cantilever 4. A scanner 5 generates relative motion between the probe 3 and a sample 6 while the probe-sample interaction is measured. In this way, images or other measurements of the sample can be obtained. Scanner 5 is typically comprised of one or more actuators that usually generate motion in three mutually orthogonal directions (XYZ). Often, scanner 5 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Dings et al. U.S. Pat. No. 5,412,980.

Notably, scanner 5 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in U.S. Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

In a common configuration, probe 3 is often coupled to an oscillating actuator or drive 16 that is used to drive probe 3 to oscillate at or near a resonant frequency of cantilever 4. Alternative arrangements measure the deflection, torsion, or other characteristic of cantilever 4. Probe 3 is often a microfabricated cantilever with an integrated tip 7.

Commonly, an electronic signal is applied from an AC signal source 18 under control of an SPM controller 9 to cause actuator 8 (or alternatively scanner 5) to drive the probe 3 to oscillate. The probe-sample interaction is typically controlled via feedback by controller 9. Notably, the actuator 8 may be coupled to the scanner 5 and probe 3 but may be formed integrally with the cantilever 4 of probe 3 as part of a self-actuated cantilever/probe.

Often, a selected probe 3 is oscillated and brought into contact with sample 6 as sample characteristics are monitored by detecting changes in one or more characteristics of the oscillation of probe 3, as described above. In this regard, a deflection detection apparatus 25 is typically employed to direct a beam towards the backside of probe 3, the beam then being reflected towards a detector 11, such as a four quadrant photodetector. The deflection detector is often an optical lever system such as described in Hansma et al. U.S. Pat. No. RE 34,489, but may be some other deflection detector such as strain gauges, capacitance sensors, etc. The sensing light source of apparatus 10 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 11, appropriate signals are processed by a signal processing block 13 (e.g., to determine the RMS deflection of probe 3). The interaction signal (e.g., deflection) is then transmitted to controller 9, which processes the signals to determine changes in the oscillation of probe 3. In general, controller 9 determines an error at Block 14, then generates control signals (e.g., using a PI gain control Block 32) to maintain a relatively constant interaction between the tip and sample (or deflection of the lever 4), typically to maintain a setpoint characteristic of the oscillation of probe 3. The control signals are typically amplified by a high voltage amplifier 16 prior to, for example, driving scanner 5. For example, controller 9 is often used to maintain the oscillation amplitude at a setpoint value, $A_S$, to insure a generally constant force between the tip and sample. Alternatively, a setpoint phase or frequency may be used. Controller 9 is also referred to generally as feedback where the control effort is to maintain a constant target value defined by setpoint.

A workstation 17 is also provided, in the controller 9 and/or in a separate controller or system of connected or stand-alone controllers, that receives the collected data from the controller and manipulates the data obtained during scanning to perform data manipulation operating such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation is accomplished by moving the sample and/or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one practical mode of AFM operation, known as TappingModem™ AFM (TappingModem™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation. Alternative feedback arrangements keep the phase or oscillation frequency constant. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs, may be used herein to refer to either the microscope apparatus or the associated technique, e.g., "atomic force microscopy."

One particular use of AFMs is the imaging of samples in a fluid/liquid medium. For example, a TappingMode™ AFM may be used for the visualization of supported lipid bilayers or adsorbed single polymer molecules under liquid medium. For the imaging of samples supported in a fluid medium, some AFM components will reside in the fluid or liquid medium. To maintain the integrity of the sample, i.e., preventing contamination of the sample, the exposed surface of those components must be substantially free of any contaminants. Accordingly, before imaging, or otherwise capturing data, of a sample supported in the fluid medium, the exposed surfaces must be cleaned. In the most general terms, cleaning the exposed surfaces, for instance, the scanner, involves exposing the surfaces to one or more cleaning agents, i.e., soap and/or detergent, as well as a scrubbing tool, i.e., brush. One of the challenges with cleaning the surfaces that are loaded into the fluid medium is ensuring that fluid sensitive components are not exposed to the cleaning fluids. Hence, conventional AFMs have the fluid sensitive components, e.g., actuator elements and sensor elements, encased in a sealed housing that is separate from the cantilever holder, which is exposed to the fluidic sample and therefore should be cleaned prior to sampling. Having the cantilever holder separable from the sealed housing requires a mounting interface, which adds to the mass of the scanner and reduces the stiffness of the scanner.

As described in U.S. Ser. No. 11/687,304 high resolution at higher scan rates is achievable by increasing the fundamental resonant frequency of the tip scanner. Two of the numerous ways in which the fundamental resonant frequency of a tip scanner can be increased is scanner mass and scanner stiffness. More particularly, decreasing the mass of the scanner increases the fundamental resonant frequency of the tip scanner. Similarly, flexures, for example, can increase the stiffness of the scanner and consequently increase the scanner's fundamental resonant frequency. Thus, while a cantilever holder separable from the "fluid proof" encasing for the fluid sensitive components eases the challenges associated with cleansing the cantilever holder and the exposed surface(s) of the scanner; ultimately, such a construction decreases the fundamental resonant frequency of the scanner and therefore reduces the scan rate for the scanner. On the other hand, integrating the cantilever holder with the housing for the scanner electronics risks exposure of the fluid sensitive components to the cleaning agents during cleaning of the scanner.

One proposed solution is to enclose the scanner electronics, e.g., piezo actuators and strain gauges, in a housing to which the cantilever holder is attached. This integration of the electrical components and the cantilever holder provides a less massive and more stiff scanner, as described in U.S. Ser. No. 13/068,052 the disclosure of which is incorporated herein. To protect the electrical components from exposure to the cleaning agents and/or solutions, the components could be encased in an elastic sealant. However, given the highly sensitive nature of AFMs, the elastic sealant may negatively affect performance. Additionally, it is possible that the sealant could degrade over time as it is exposed to the cleaning agents and/or solutions. An improved solution was desired.

SUMMARY OF THE INVENTION

The present invention provides a cleaning station for thoroughly cleaning the AFM component surfaces that are exposed to fluid during sampling of a sample supported in a fluid medium. The cleaning station is designed to selectively expose the AFM component surfaces to cleansing agents, such as soap/detergent and water, plasma cleaning, etc., and cleaning tools, such as brushes, while protecting fluid sensitive components from exposure to the cleansing agents. The invention is particularly beneficial for scanners in which the fluid sensitive components (actuator, sensor, connector, etc.) are integrated in the same device to which the cantilever holder is attached, as described in U.S. Ser. No. 13/068,052 and generally shown at FIGS. 15-17.

The cleaning station is designed to temporarily enclose the fluid sensitive components of the scanner yet expose the surfaces of the scanner that contact the sampled fluid during imaging. In this regard, the surfaces that require cleaning are exposed to the environment for washing/cleaning while the fluid sensitive components are enclosed in such a way that they are not exposed to the environment during the cleaning process. In one form of the cleaning station, the scanner to be cleaned is seated in an opening formed in fluid sealed housing. The fluid sealed housing effectively provides a temporary enclosure for the fluid sensitive components of the scanner. An opening is formed in the fluid sealed housing such that when the scanner is loaded into the fluid sealed housing, the surface of the scanner to be cleaned is exposed. A gasket in the opening engages the outer wall of the scanner and is operative to provide a watertight seal against the outer wall(s) of the scanner. Hence, cleansing agents applied to the exposed surface of the scanner are prevented from flowing into the temporary enclosure. As such, cleaning agents such as soap and/or detergents, water and pressurized gasses may be applied to the surface of the scanner to be cleaned without those materials leeching into the internal chamber of the fluid sealed enclosure.

The cleaning station may also be sized to enclose the cable that is connected to the electronics of the scanner. As the exposed end of the cable may also be sensitive to the cleaning agents, enclosing the exposed end of the cable within the fluid sealed housing prevents exposure of the exposed end of the cable to the cleaning agents during cleaning of the exposed surface of the scanner. Alternately, the exposed end of the cable may be secured in a separate fluid sealed housing to prevent exposure to the cleaning agents.

The cleaning station is preferably made from corrosion-resistant components that can withstand repeated exposure to otherwise caustic cleansing agents and fluids. Additionally, the cleaning station has mechanical integrity sufficient to withstand exposure to high pressure cleaning fluid such as pressurized gases or plasma.

The cleaning station may be configured to hold a single scanner for cleaning or may be configured to hold multiple scanners to allow simultaneous cleaning of the multiple scanners. To accommodate more than one scanner, the fluid sealed housing may have multiple openings into which multiple scanners may be seated. Each opening has a gasket to seal the sensitive electrical components of each scanner from the cleaning agents.

According to a preferred embodiment, an apparatus for cleaning a surface of an AFM component includes a housing defining an enclosure. An opening formed in the housing and into the enclosure is also provided. A seal supported in the opening and configured to engage an outer surface of the AFM component loaded into the opening operates to prevent the ingress of cleaning fluid presented to an exposed surface of the AFM component into the enclosure.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE INVENTION

The present invention is generally directed to a cleaning station for cleaning exposed surfaces of an AFM component, such as a scanner. In this regard, the invention is particularly useful for cleaning AFM components that come into contact with fluid when imaging or collecting data from samples contained in the fluid. While the cleaning station will be described and shown relative to a particular AFM scanner construction, it is understood that the invention is not so limited and thus could be used with other types of scanners or components of a microscopy system. While the cleaning station is believed to be particularly beneficial for cleaning a scanner such as that shown in FIGS. 15-17 and described more fully in U.S. Ser. No. 13/068,052) the disclosure of which is incorporated herein, the invention may be used with other scanners as well including, but not limited to scanners of less compact design than the scanner shown in FIGS. 15-17.

Figure 1:
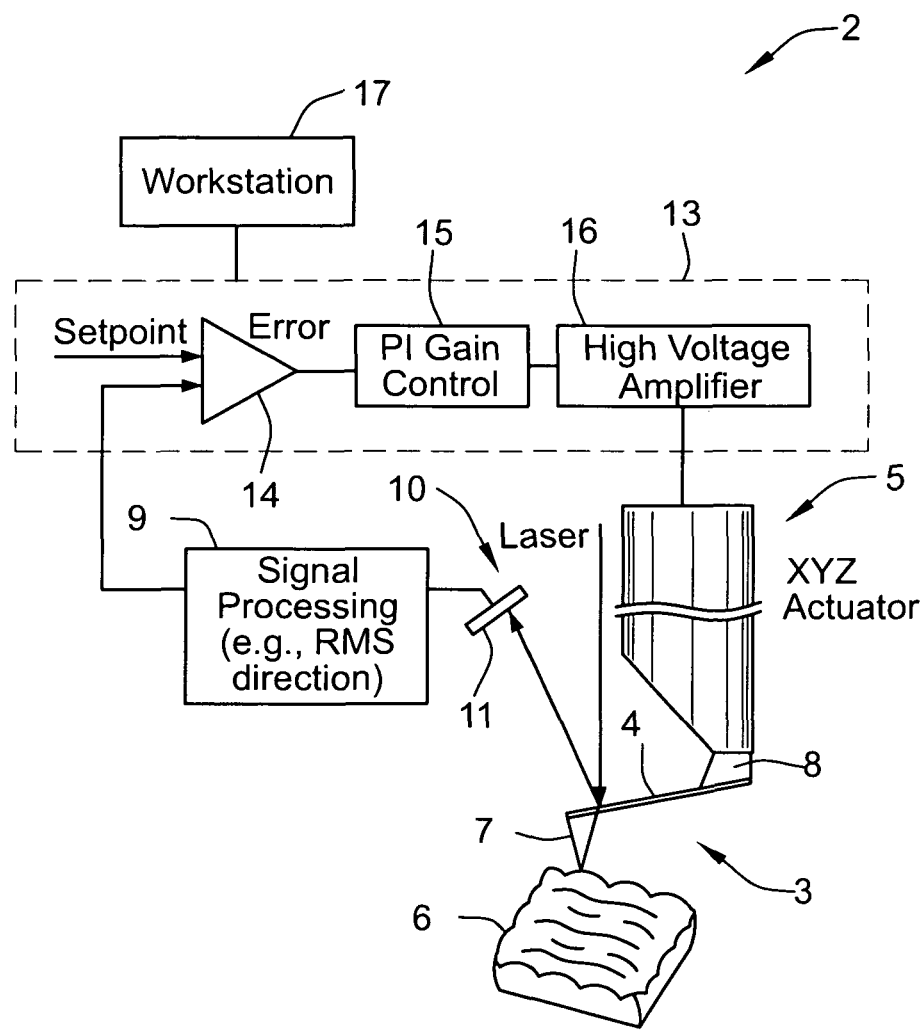
FIG. 1 is a schematic block drawing of a Prior Art atomic force microscope (AFM)
Figure 2:
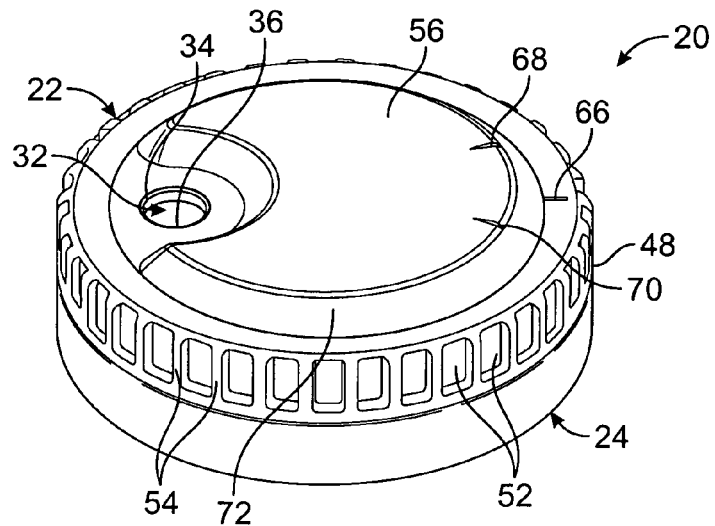
FIG. 2 is an isometric view of a cleaning station for cleaning an AFM scanner according to one embodiment of the invention.
Figure 3:
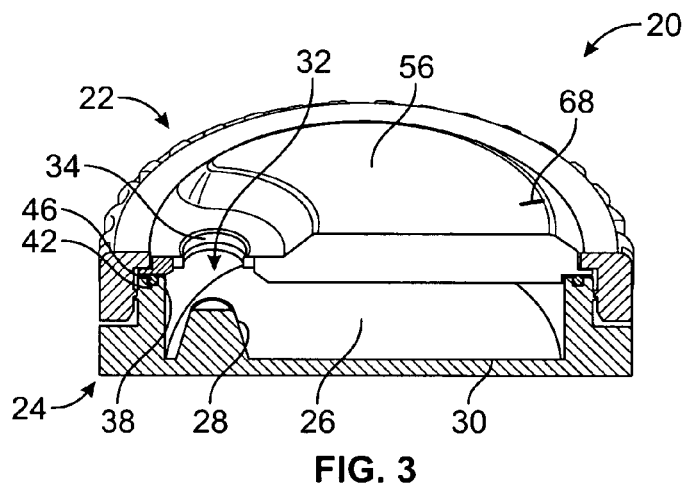
FIG. 3 is a partial cutaway view of the cleaning station of FIG. 2.

Turning now to FIGS. 2-7, a cleaning station 20 according to one embodiment of the invention includes a cover 22 and a base 24 that collectively define an enclosure 26, when the cover 22 is engaged with the base 24, as best shown in FIG. 3. With the illustrated cleaning station 20, the cover 22 and the base 24 are each disc-shaped, but it is understood that the invention is not so limited. The base 24 provides a surface against which the scanner or other AFM component may be seated when loaded into the cleaning station 20. In one preferred embodiment, the base 24 includes a pedestal 28 that extends from the floor 30 of the base 24 onto which the scanner may be seated. The pedestal has a tapered surface that mirrors a taper of the scanner shown in FIGS. 15-17, and therefore provides a relatively snug seating of the scanner on the base 24. Additionally, as will be described more fully below, the cover 22 is detached from the base 24 when the scanner is loaded onto the base 24. The pedestal 28 thus also functions as alignment aid so that the scanner is properly loaded onto the base 24.

The cover 22 has an opening 32 that aligns with the pedestal 28 when the cover 22 is mated to the base 24. In the illustrated embodiment, the opening is a circular opening but other shaped openings could be used. A gasket 34 is attached to the cover 22 and fits within the opening 32. In the illustrated embodiment, the gasket 34 is an annular gasket to match the shape of the circular opening 32. Thus, it is understood that the gasket 34 may have a different shape to accommodate different shaped openings.

The opening 32 is sized to receive an end of the AFM scanner and, more particularly, receive the end of the AFM scanner to be cleansed. The inner radial edge 36 of the gasket 34 engages the outer wall of the AFM scanner and provides a seal around the body of the AIM scanner to prevent cleaning fluid and agents from passing through the opening 32 and into the enclosure 26. The interfacing between the scanner and the cleaning station 20 and, in particular, gasket 34 will be described more fully below with respect to FIG. 9.

Figure 4:
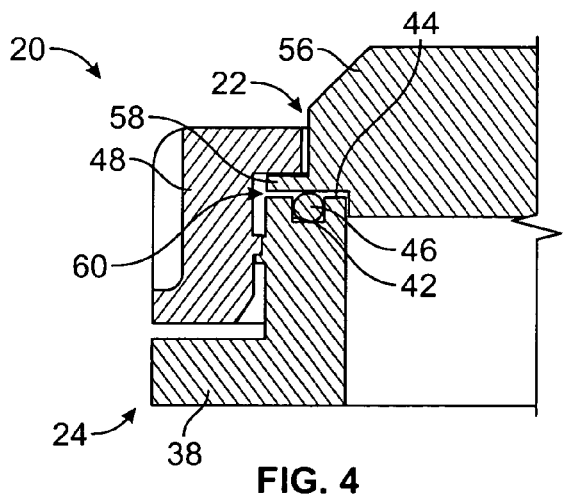
FIG. 4 is an enlarge view of the cleaning station of FIG. 3.
Figure 5:
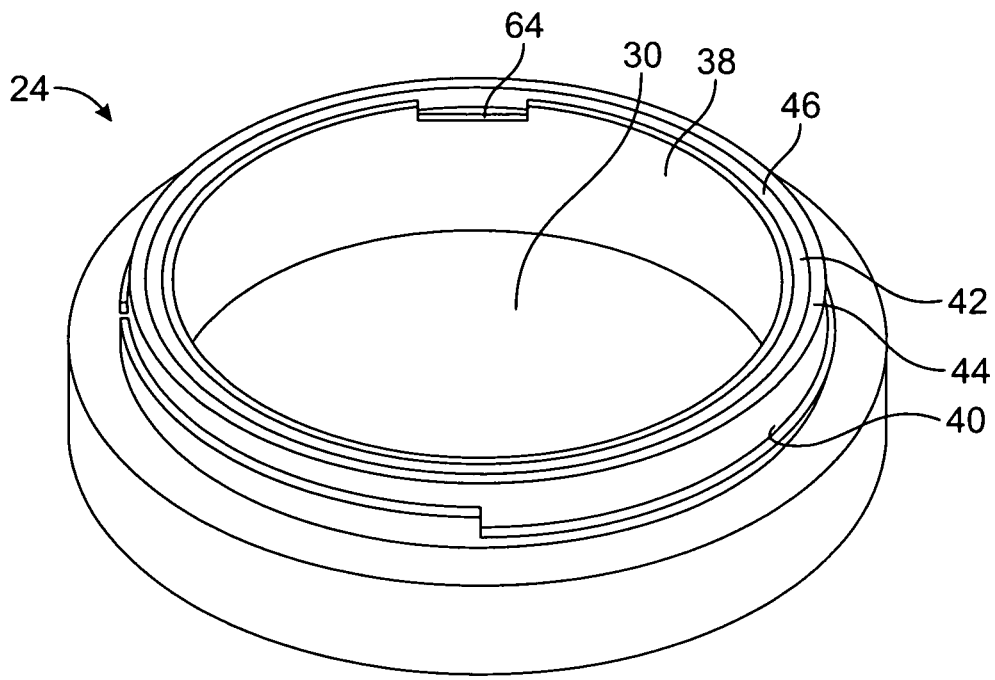
FIG. 5 is an isometric view of the base of the wash basin of FIG. 2.
Figure 7:
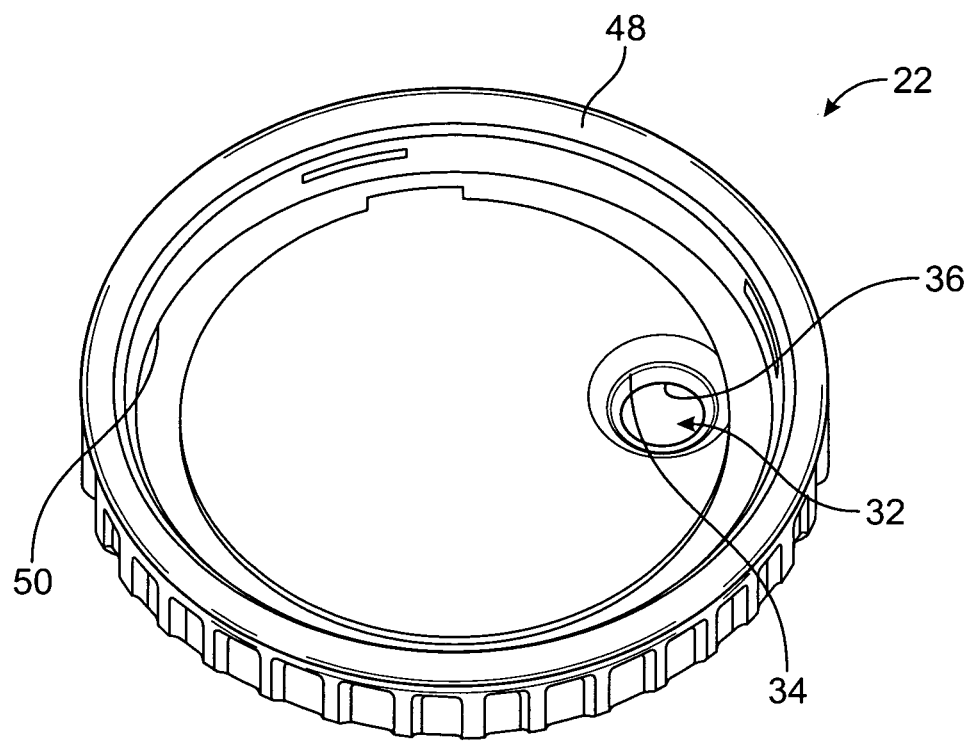
FIG. 7 is a bottom plan view of the cover of the of the cleaning station of FIG. 2.

The base 24 has an annular wall 38 that extends from the floor 30 of the base 24. Threads 40 are formed in a conventional manner around the outer surface of the annular wall 38. An annular groove 42 is formed in a top edge 44 of the annular wall 38. An o-ring 46 is seated in the annular groove 42 and is compressed into the annular groove 42 when the cover 22 is threaded onto the base 24. As shown in FIGS. 4 and 7, the cover 22 has outer ring 48 with an outer diameter that is substantially matched to the diameter of the annular wall 38 of the base 24. The inner surface of the outer ring 48 contains threads 50 that are designed to engage the threads 40 of the base 24 in a conventional manner. As shown in FIG. 2, the exterior surface of the outer ring 48 has a series of notches 52 that are spaced apart from one another by ribs 54. The combination of the ribs 54 and notches 52 effectively create a gripping surface for a user, or machine in an automated system, to grasp the cover 22 and tighten it down onto the base 24 by rotating the cover 22 relative to the base 24. As best shown in FIG. 4, as the cover 22 is tightened down onto the base 24, the o-ring 46 seated in the annular groove 42 creates a seal between the cover 22 and the base 24. The o-ring 46 is preferably formed of corrosion resistant material that will not degrade prematurely if exposed to the cleaning agents used to clean the scanner.

In one embodiment, the outer ring 48 of the cover 22 is in the form of a rubberized or plastic ring that is resistive to corrosion that may be otherwise caused by the cleaning agents used to clean the scanner. In addition to the ring 48, the cover 22 has a cap 56 that is rotatable relative to outer ring 48. As best shown in FIG. 4, the cap 56 has a flange 58 that is movable between an "open" position and a "closed" position when the outer ring 48 is rotated relative the outer cap 56. When the cover 22 is tightened down onto the base 24, the outer ring 48 provides compression between the annular wall 38 of the base 24 and the cap 56 as best shown in FIG. 4 at 60. The outer ring 48 is captive, i.e., rotatable around, but not user separable from the cap 56. In this regard, the cap 56 does not rotate relative to the base 38 as the cover 22 is tightened onto the base 24. That is, the outer ring 48 is free to rotate relative to the cap 56 and the interface between a flange of the cap and a cutout of the base, as will be described below, prevent the cap 56 from rotating as the outer ring 48 is threaded onto the base 24.

A cutout 64 is formed at the upper end of the inner surface of the annular wall 38 of the base 24. This cutout 64 is designed to receive the flange 58 of the cap 56 when the cap 56 is in the open position. The cutout 64 and the flange 58 cooperate to ensure that the cover 22 is properly seated on the base 24 before the cover 22 is tightened down on the base 24. If the cover 22 is misaligned when it is tightened down on the base 24, a poor seal may form between the cover 22 and the base 24. Additionally, the threads 40, 50 may otherwise be damaged if a misaligned cover 22 was tightened down onto the base 24.

To assist a user in differentiating between the open and closed position, a marker 66 is formed on the outer ring 48. The cap 56 has an open mark 68 and a closed mark 70 to identify the open and closed positions, respectively. In this regard, when the outer ring 48 of the cap 56 is rotated so that the open mark 68 aligned with the marker 66 on the outer ring 48, the flange 58 shall fall into the cutout 64 to properly align and seat the cover 22 on the base 24. On the other hand, when the closed mark 70 is aligned with the marker 66, the flange 58 will be misaligned with the cutout 64 thereby preventing the cover 22 from seating properly on the base 24. Moreover, the association of the open mark 68 and the marker 66 is designed to ensure that the opening 32 aligns with the pedestal 28 when the cover 22 is properly seated on the base 24.

Figure 6:
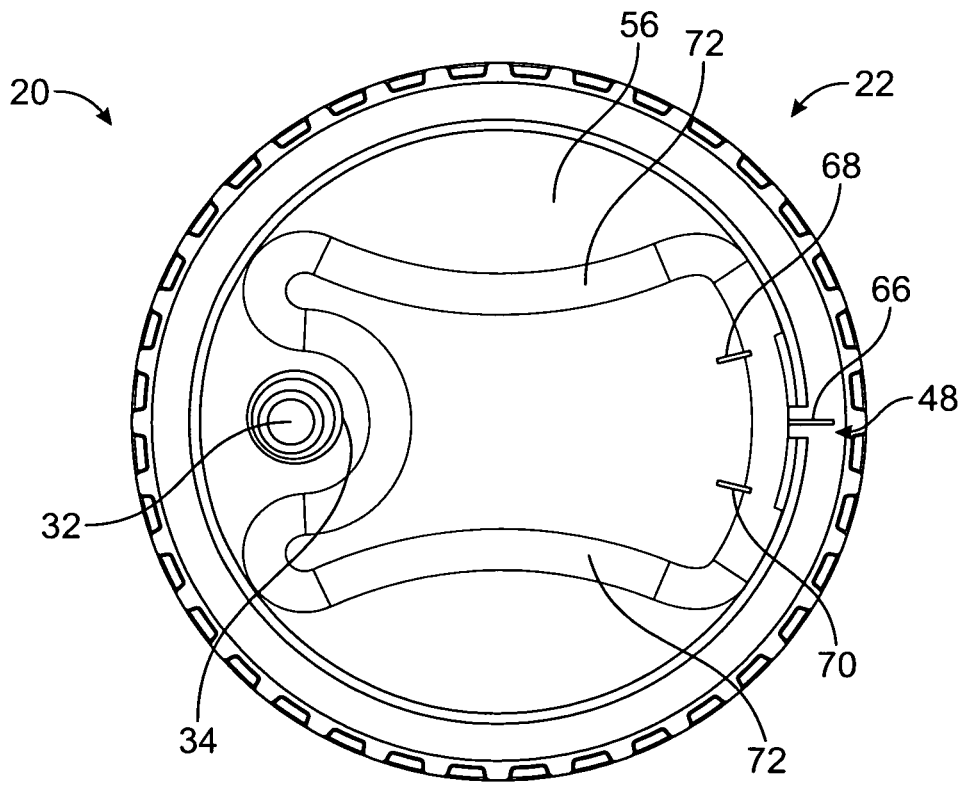
FIG. 6 is a top plan view of the cleaning station of FIG. 2.

The cap 56 preferably has a raised portion 72 operable as a handle to rotate the cap 56 between the aforementioned open and closed positions. The shape of the raised portion can be designed to provide for good cleaning fluid run-off. The shape of the raised portion can also prevent fluid from potentially contaminated outside surfaces of the container, or from the hands of the operator, to run onto the surfaces of the AFM component to be cleaned. It is understood that the shape of the raised portion 72 could vary from that illustrated in FIG. 2. For example, FIG. 6 shows the cover 22 with a different shaped raised portion.

It is understood that other types of alignment aids could be used to ensure proper alignment of the cover 22 with the base 24 before the cover 22 is tightened onto the base 24.

Figure 8:
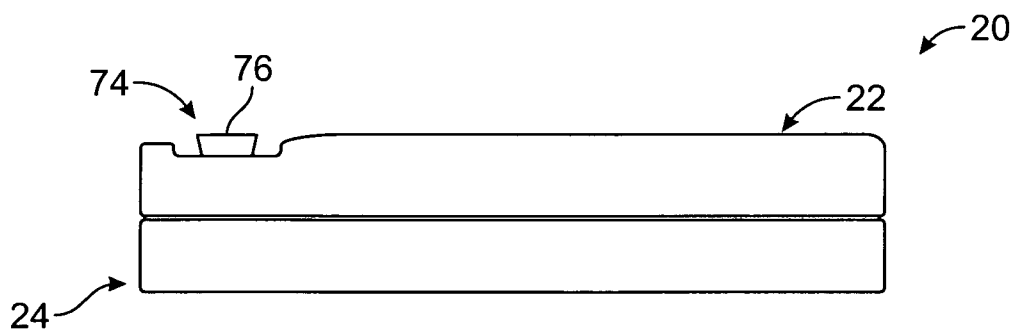
FIG. 8 is a side elevation view of the cleaning station of FIG. 2 loaded with an AFM scanner for cleaning.
Figure 9:
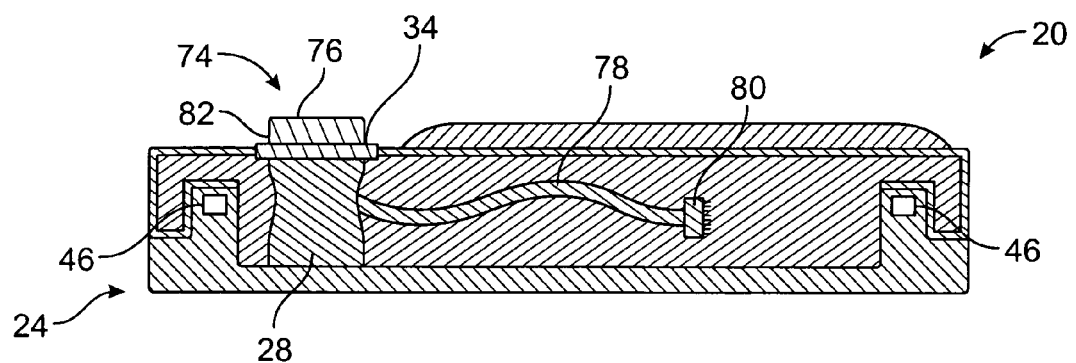
FIG. 9 is a section view of the cleaning station loaded with an AFM.

Turning now to FIGS. 8 and 9, the cleaning station 20 is designed to seal fluid sensitive components of a scanner 74 from the cleaning agents that are used to clean the surface of the scanner that is loaded into the fluid medium during sampling. In this regard, the opening 32 is sized so that the exterior surface 76 of the scanner 74 to be cleaned extends through the opening 32 formed in the cover 22. Gasket 34 tightly engages the outer wall of the scanner 74 and thus seals the components of the scanner 74 extending beneath the plate 56 from being exposed to the cleaning agents during cleaning of surface 76.

Moreover, as best shown in FIG. 9, the enclosure 26 formed by the cover 22 and the base 24 is large enough to accommodate the cable 78 that is connected to the electronics of the scanner 74. As such, the exposed plug 80 of the cable 78, which is also typically sensitive to water and cleaning agents is also sealed from the cleaning agents during cleaning of the exposed enclosure 26 of the scanner 74. As will be described more fully below with respect to FIGS. 15-17, the scanner 74 has an annular channel 82 formed along its body and the radial edge 36 of the gasket 34 is received in this channel 82 when the scanner 74 is loaded into the opening 32.

In a preferred embodiment, to ready the scanner 74 for cleaning, the cap 56 is first aligned with the outer ring 48, i.e., the open mark 68 is aligned with marker 66. This, as described above, ensures proper alignment between the cover 22 and the base 24. Next, the scanner 74 is passed through the opening 32 so that the surfaces of the scanner 74 to be cleaned extend through the opening 32. The scanner 74 is passed through the opening 32 until the surfaces of the scanner 74 to be cleaned are exposed. The cable 78 is then collected and laid on the floor 30 of the base 24, e.g., pedestal 28. The cover 22 is then brought into contact with the base 24 and tightened down, as described above, to seal the cover 22 onto the base 24. As the outer ring 48 is rotatable relative to the cap 56, the cover 22 can be tightened down onto the base 24 without rotating the scanner 74 seated on the base 24. The combination of the gasket 34 and the o-ring 46 collectively seal the enclosure 26, and thus the sensitive electrical components of the scanner 74, from the cleaning agents and tools that are used to clean the exposed surface 76 of the scanner 74.

In an alternate process, the scanner 74 can be loaded onto the base 24, e.g., pedestal 28, the cable 78 collected, and placed on the floor 30 of the base 24. The cap 56 and the outer ring 48 may be manually aligned to ensure a proper lit of the cover 22 with the base. Thereafter, the cover 22 is lowered onto the base 24 with the opening 32 aligned with the scanner 74. As the outer ring 48 is rotated, the cover 22 is lowered relative to the scanner 74, which causes the scanner 74 to extend through the opening 32. The gasket 34 engages the outer surface of the scanner 74, as previously described. The outer ring 48 is rotated until the cover 22 is tightened down onto the base 24 thereby sealing the enclosure 26 encasing the portion of the scanner 74 containing fluid sensitive components and the cable 78.

Figure 10A:
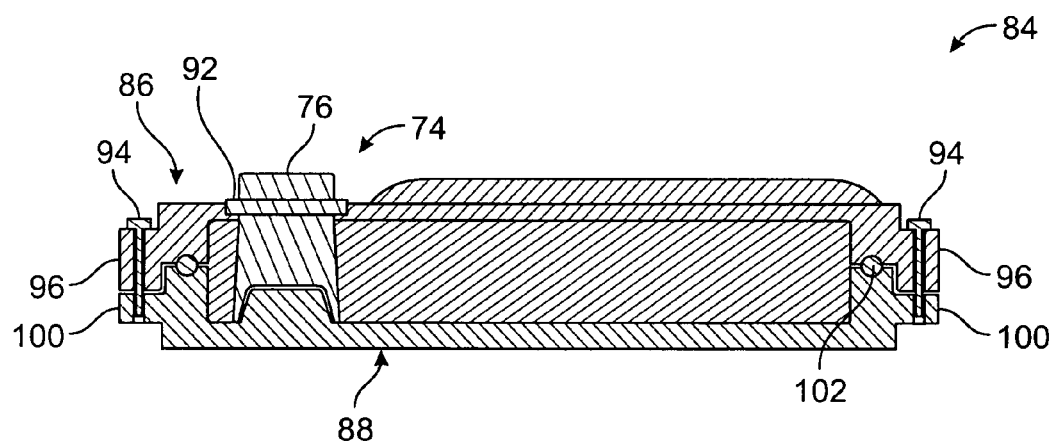
FIG. 10A is a section view of the cleaning station of FIG. 10.
Figure 10:
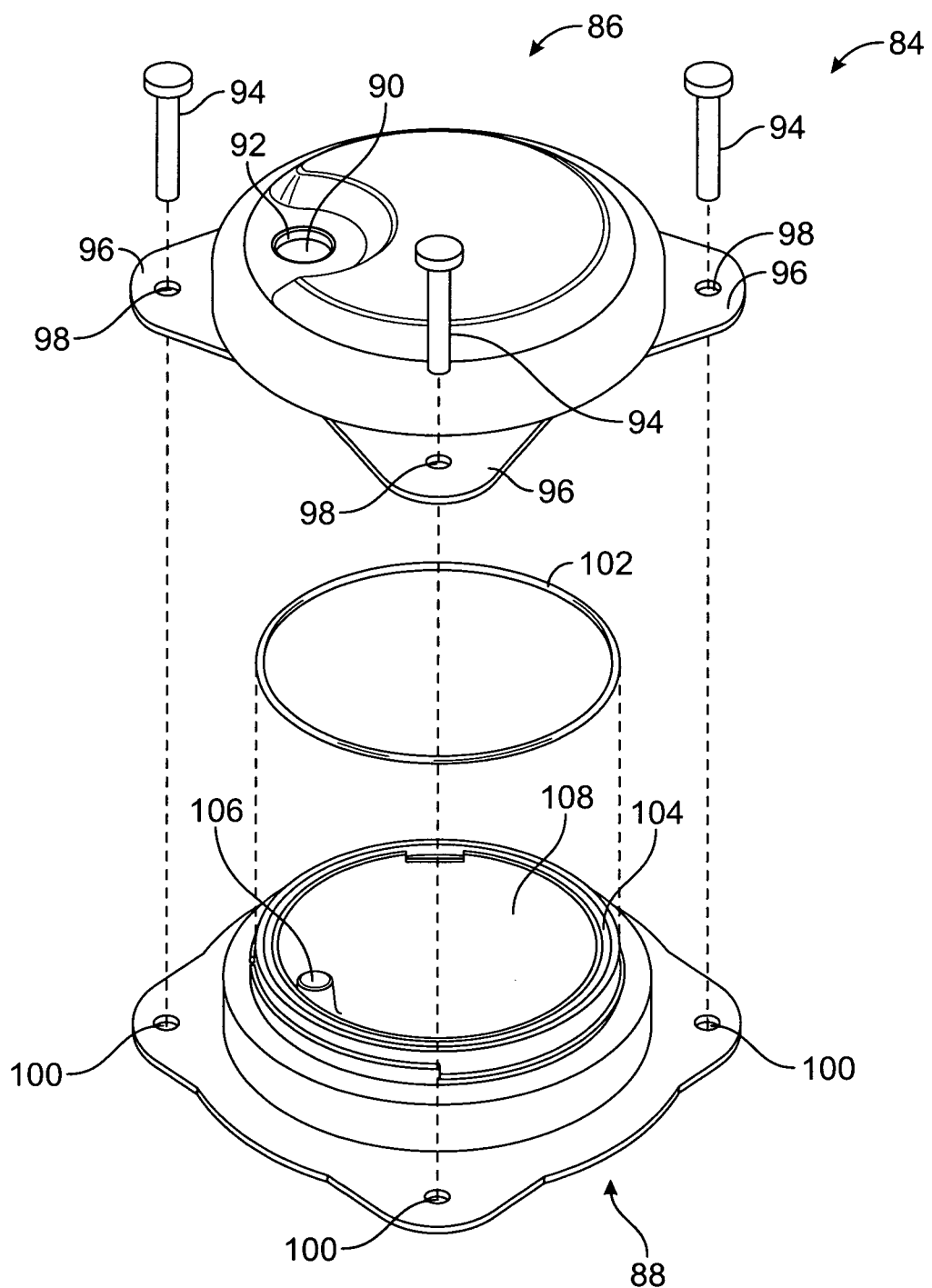
FIG. 10 is an exploded view of a cleaning station according to another embodiment of the invention.

Turning now to FIGS. 10 and 10A, a cleaning station 84 according to another embodiment of the invention is shown. This cleaning station 84 is generally similar to cleaning station 20 described above in that it has a cover 86 and a base 88 that when mated together collectively define an enclosure. The cover 86 has an opening 90 designed to receive an exposed end of scanner 74 to be cleaned. A gasket 92 is sealed in the opening 90 and engages tightly against the outer surface of the scanner 74 when the scanner 74 is loaded into the cleaning station 84. Rather than using a threaded engagement to couple the cover 86 to the base 88, cleaning station 84 uses compression screws 94. More particularly, the cover 86 has ledges 96 with holes 98 bored at selected positions thereal-ong. Similarly, the base 88 has threaded holes 100 that align with holes 98 when the cover 86 is properly aligned with the base 88. Screws 94 can then be inserted through the respective holes and tightened down in a conventional manner using a driver (not shown). The screws may also be thumb screws. The screws may also be captive on the component not containing the mating threads. To seal the cover 86 and the base 88, an o-ring 102 is provided that sits in an annular channel 104 formed in the base 88. Hence, when the cover 86 is tightened down onto the base 88, a tight seal is formed by the o-ring 102 to prevent the ingress of fluid into the enclosure collectively defined by the cover 86 and the base 88. In a preferred embodiment, an alignment podium 106 extends from the floor 108 of the base 88, and is designed to provide a structure onto which the scanner 74 can be seated when the scanner 74 is loaded into the cleaning station 84.

Cleaning station 84 allows the scanner 74 to be loaded in a slightly different manner than that described above with respect to cleaning station 20. More particularly, in one preferred mounting method, the cover 86 is detached from the base 88 to expose the alignment podium 106. The scanner 74 is then seated onto the alignment podium 106. The cable 78 is collected and placed on the floor 108 of the base 88. The cover 86 is then aligned with the base 88 and lowered into position. This lowering of the cover 86 causes a portion of the scanner 74 to pop through the opening 90 in the cover 86. And, as described above, the gasket 92 tightly engages the outer surface of the scanner 74 to provide a sealed engagement of the scanner 74 with the cover 86. The compression screws 94 may then be inserted into the mounting holes and tightened, as described above, to compress the cover 86 and the base 88 against o-ring 102 and provide a tight seal therebetween.

It is also contemplated however that the scanner 74 could be loaded into cleaning station 84 in a manner similar to that described with respect to cleaning station 20 in that the scanner 74 is engaged with the cover 86 and then the cover is mated to the base 88.

Figure 11:
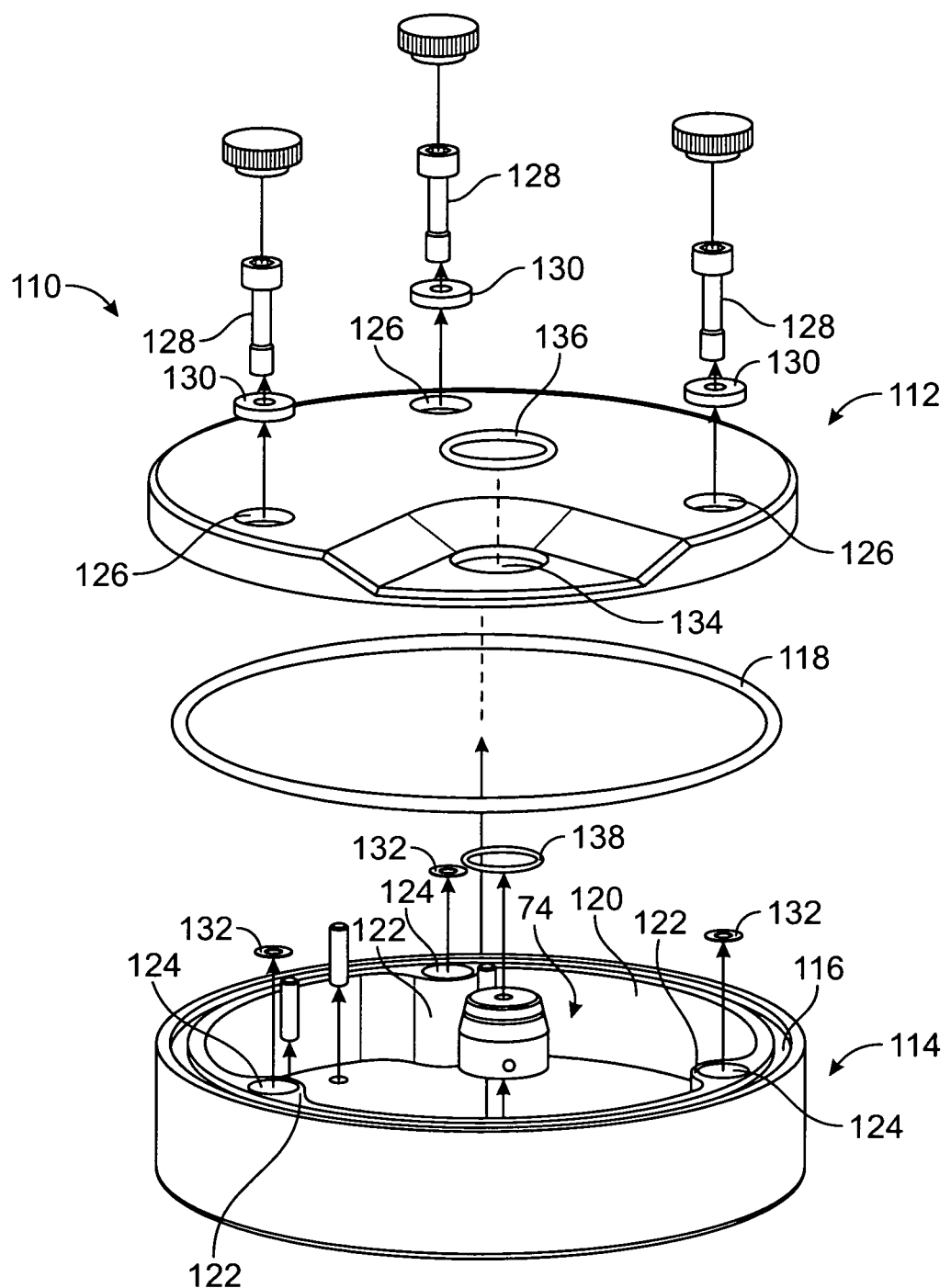
FIG. 11 is an exploded view of a cleaning station according to yet another embodiment of the invention.

Turning now to FIG. 11, a cleaning station 110 according to another embodiment of the invention is shown. Cleaning station 110 is similar to the cleaning stations heretofore described in that it comprises a cover 112 and a base 114 that mate together to form an enclosure. The base 114 has an annular groove 116 adapted to receive an o-ring 118 that seals the interface between the cover 112 and the base 114. Rather than outwardly extending ledges having holes to facilitate a compression fit of the cover 112 to the base 114, this cleaning station 110 is constructed such that the inner annular wall 120 of the base 114 has inwardly extending lobes 122 with holes 124 formed therein. The holes 124 align with holes 126 formed in the cover 112. Fasteners 128 may then be passed through the aligned holes 126, 128 to tightly fit the cover 112 against the base 114. Preferably, the fasteners 128 pass through pairs of small seals 130, 132 to prevent fluid from passing through holes 126.

The cover 112 has an opening 134 through which the scanner 74 may be passed in a manner similar to that described above. A gasket 136 is attached to the opening 134 to prevent the ingress of fluid through the opening 134 when the scanner 74 is loaded for cleaning. As shown in FIG. 11, it is contemplated that an additional gasket 138 may be attached to the underside of the cover 112 to provide additional sealing of the opening 134. Although now shown in FIG. 11, it is contemplated that that cleaning station 110 may have an alignment pedestal similar to that described above.

Figure 12:
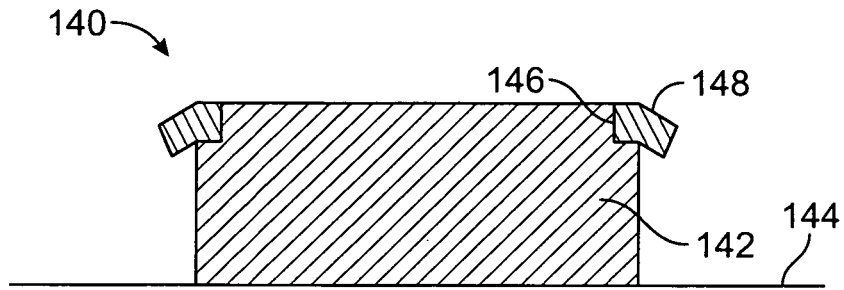
FIG. 12 is a section view of a cleaning station according to another embodiment of the invention.
Figure 13:
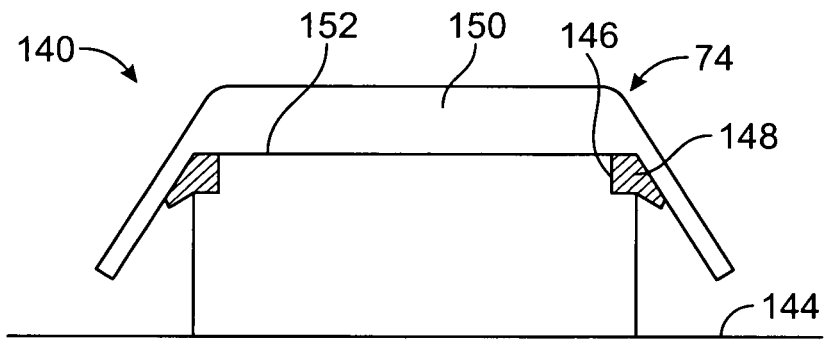
FIG. 13 is a section view of the cleaning station of FIG. 12 shown loaded with a scanner for cleaning according to the invention.

Turning now to FIG. 12, a cleaning station 140 according to another embodiment of the present invention is shown. Cleaning station 140 has a platform 142 that sits atop a work surface 144. An annular groove 146 is formed in the outer surface of the platform 142. A seal 148, such a gasket, is positioned in the annular groove 146 and prevents the ingress of fluid into the scanner 74 when the scanner 74 is loaded onto the platform 142, as best shown in FIG. 13. In this embodiment, it is expected that the fluid sensitive components are mounted adjacent the upper end of the scanner 74 (when the scanner is loaded onto the platform 142) in a cavity 150 effectively defined between exposed surface 76 of the scanner 74 and the upper surface 152 of the platform 142. The seal 148 is placed adjacently below the upper surface 152 to prevent the ingress of fluid into the cavity 150 that is formed between the platform 142 and the scanner 74.

Figure 14:
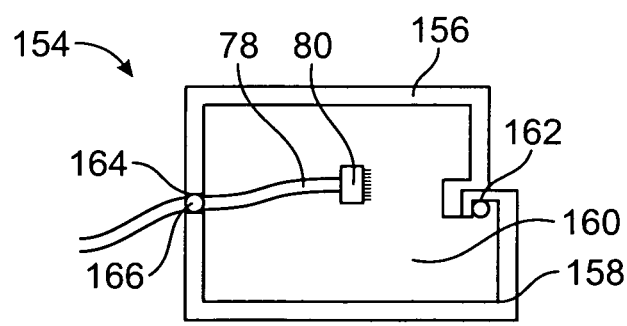
FIG. 14 is a sectional view of a sealing chamber for sealing the exposed end of a cable of an AFM scanner being cleaned according to a further embodiment of the present invention.

In this embodiment, which is a somewhat simplified version of cleaning station 20, 84, the plug 80 of the scanner cable 78 remains exposed. Accordingly, the present invention also provides for a sealing container 154 for the plug 80, one embodiment of which is shown at FIGS. 13 and 14. In the illustrated embodiment, the sealing container 154 includes a pair of mating shells 156, 158 that collectively define a chamber 160 for receiving the plug 80. Upper shell 156 is preferably hinged to lower shell 158 at joint 162 that is sealed in a conventional mariner. A slot 164 is formed between the upper shell 156 and the lower shell 158 that allows the cable 78 to extend from the plug 80 and out of the sealing container 154. A gasket 166 is positioned in the slot 164 to prevent the ingress of fluid through slot 164 and into the chamber 160. It will thus be appreciated that the combination of cleaning station 140 and sealing container 154 prevent exposure of fluid sensitive components of the scanner 74 from being exposed to cleaning agents and fluids during cleaning of the scanner 74.

Figure 15:
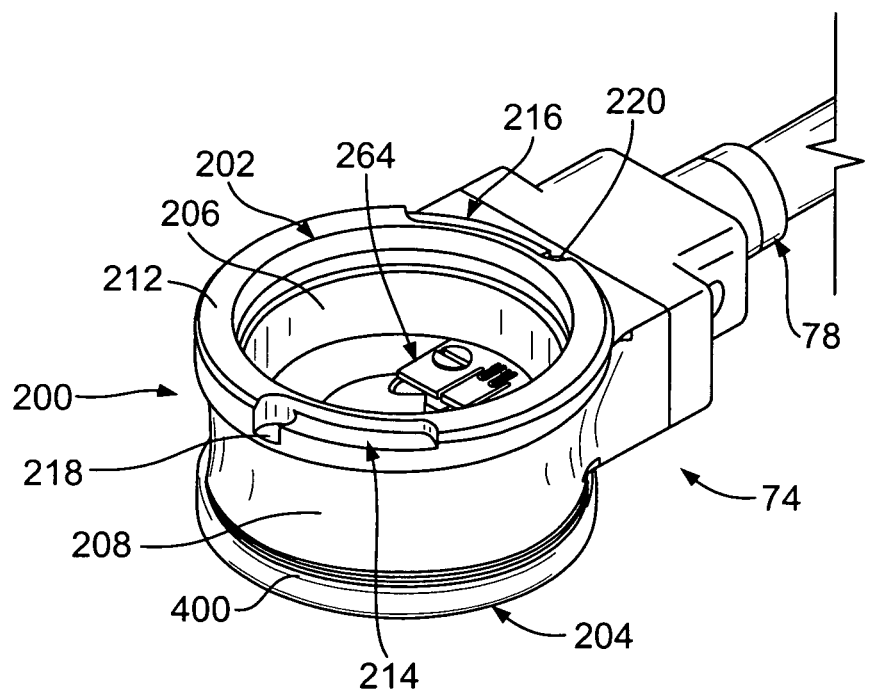
FIG. 15 is an isometric top view of an AFM scanner that may be cleaned using the cleaning station of the present invention.
Figure 16:
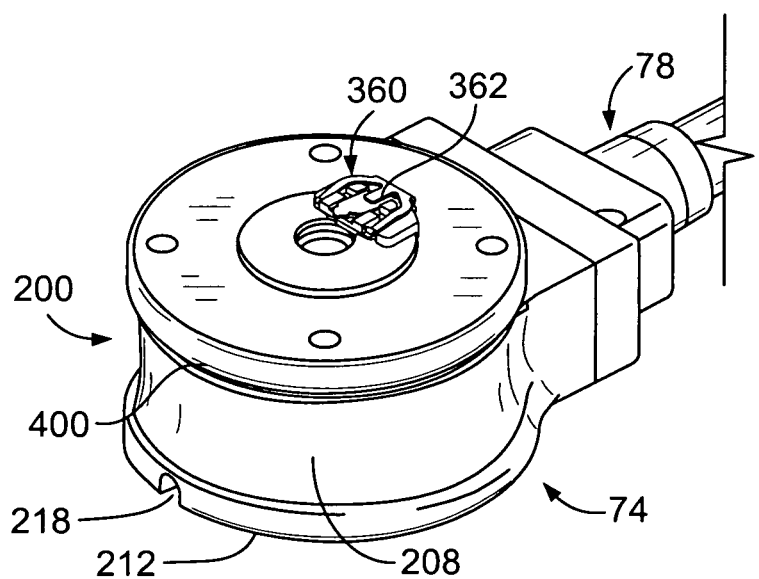
FIG. 16 is an isometric bottom view of the AFM scanner of FIG. 15.
Figure 17:
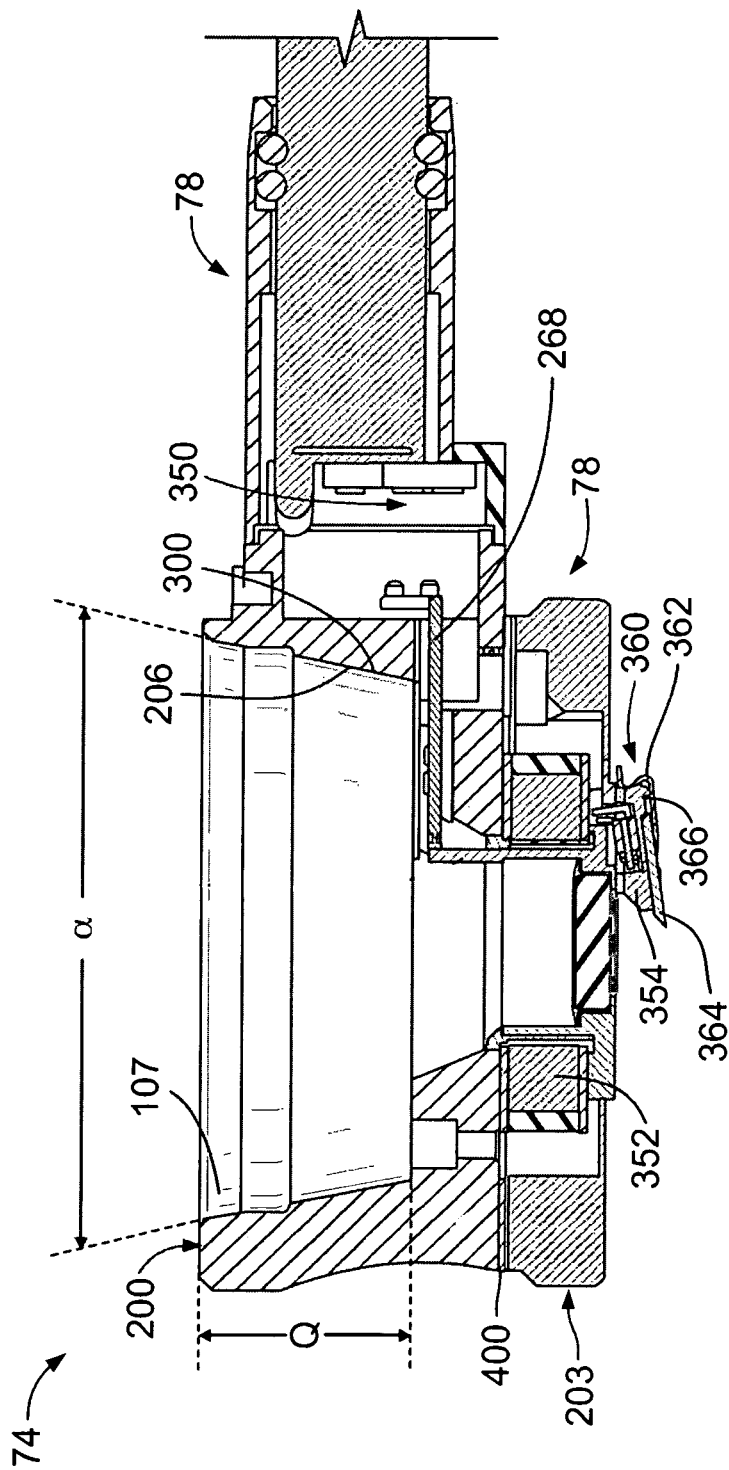
FIG. 17 is a section view of the AFM scanner shown in FIG. 15.

As described above, the washing stations of the present invention can be used to clean several different types of scanners. One exemplary scanner is shown in FIGS. 15-17, which is described in U.S. Ser. No. 13/068,052 in greater detail.

Turning now to FIGS. 15-17, scanner 74 includes a body 200 having an inner surface 206 and an outer surface 208 which essentially has a nozzle shape. Extending from scanner body 200 is scanner cable 78 which electronically connects scanner 74 to AFM head (not shown), thus providing control and communication between head and scanner 74. Body 200 includes a first or top end 202 that is open and which configured to be rigidly coupled to the AFM head. Opposite first end 202 is a second or bottom end 204 that is closed and sealed so that it may be introduced to varying environments, including fluid, while protecting the sensitive scanner components housed within body 200. A probe holder 360 is provided at second end 202. Probe holder 360 includes a retaining clip 362 for holding probe assemblies during AFM operation, and is preferably formed integrally with second end 202.

First end 202 includes a rim 212 that is formed with a pair of annular slots 214, 216, the slots extending a length along rim 212 and being disposed about 180 degrees from one another. Slots 214, 216 terminate in corresponding openings 218, 220 that are adapted to receive indexing pins (not shown) coupled to the head and extending downwardly from the AFM head. When scanner 74 is so coupled, proper orientation of scanner 74, and correspondingly, the probe holder and probe(s) supported by scanner 74 is required. When coupling scanner 74 to the AFM head the aforementioned pins ride in corresponding slots 214, 216 as the AFM user rotates the scanner until pins engage openings 218, 220. When pins drop into openings 218, 220 the scanner is properly oriented and further rotation of the scanner is prevented. In this position, scanner 74 is rigidly mounted to the AFM head, as further described in U.S. Ser. No. 13/068,052. The scanner 74 also includes a sensor 264 including a substrate 268.

Turning to FIG. 17, more detail of scanner 74 and corresponding cable 78 is illustrated, along with further detail concerning probe holder 360 bonded to scanner 74. In particular, cable 78 is coupled to scanner 74 with an interconnect PCB 350 disposed between the two for communication between scanner 74 and the fast scanning AFM head. An insulator 352 is bonded to a bottom surface of second body portion 203 of body 200 of scanner 74. A wedge 354 is further bonded to insulator and provides a selected amount of tilt for a probe device held by the probe holder. A probe clip 360 is formed integrally with probe holder 360, clip 362 operating to hold probes 364 against wedge 354. Notably, a tapping piezo electric assembly 366 is formed in a cavity (not numbered) formed in wedge 354. Appropriate wiring is provided to excite tapping piezo electric assembly 364. Because probe holder 360 is formed integrally with the scanner 74, a rigid structure is provided having significantly greater resonance than conventional AFMs.

Overall, referring again to FIG. 13, the scanner mount and compact probe holder design of the scanner significantly improve what was a significant limitation on system resonance. Rather than some known systems which utilize a mechanically non-rigid coupling between probe holder and scanner (e.g., pins extending downwardly from a piezoelectric tube into probe holder openings), in the present preferred embodiments, the tapered surface 300 of the scanner 74 together with a tapered surface of the objective (not shown) provide a rigid mechanical connection between the two. This rigid coupling is provided by maintaining significant surface area of scanner 74 in direct contact with an outer surface of free end portion of the objective (not shown). As shown in FIG. 13, the length "Q" of the cylindrical interface between the two structures is substantial, providing large surface area of contact between the two components, thus yielding a very rigid structure. This facilitates high resonance capability.

Preferably, a angle of taper, $\alpha$, is preferably between about 15° and 35°, and ideally about 22°, is employed. The actual amount of taper in the arrangement is a trade-off between ease-of-use and position repeatability of scanner 74. If the angle is much smaller than 22°, the scanner 74 cannot be readily removed by hand. If, on the other hand, an angle much larger than 22° is employed, scanner position on the taper will not likely be as accurate and repeatable.

As further shown in FIG. 17, an annular groove 400 formed adjacent the second body portion 203 of the scanner body. As described above, groove 400 effectively functions as a receiver for the leading of a gasket, e.g., gasket 34 of cleaning station 20. When the leading edge of the gasket seats in groove 400, a relatively tight seal is formed between the gasket and the scanner body which is substantially impervious to the flow of fluid, i.e., cleaning agents.

The present invention has been described with respect to cleaning stations for sealing fluid sensitive components of a scanner from contact with potentially damaging cleaning agents and fluids. While these cleaning stations have been shown and described with respect to cleaning one scanner at a time, it is understood that the cleaning stations of the present invention could be constructed so that multiple scanners could be cleaned at a time.

We claim:

1. An apparatus for cleaning a surface of an AFM component comprising:
   a housing defining an enclosure;
   an opening formed in the housing and into the enclosure;
   a seal supported in the opening and configured to engage an outer surface of the AFM component loaded into the opening such that a portion of the component to be cleaned resides outside the housing for cleaning using at least a cleaning fluid and another portion of the component to be cleaned remains protected from the cleaning fluid inside the housing, wherein the seal prevents the ingress of cleaning fluid presented to an exposed surface of the AFM component into the enclosure.

2. The apparatus of claim 1, wherein the housing includes a cover and a base collectively defining the enclosure, and wherein the cover and the base are removably coupled to one another.

3. The apparatus of claim 2, further comprising an o-ring sandwiched between the cover and the base to prevent the ingress of fluid into the enclosure.

4. The apparatus of claim 2, wherein the cover and the base are configured to be threadingly engaged with one another.

5. The apparatus of claim 2, further comprising a compression fastener configured to mate the cover and the base to one another.

6. The apparatus of claim 2, wherein the base includes a pedestal which a) supports the AFM component, and b) aligns the AFM component with the opening.

7. The apparatus of claim 6, wherein the AFM component is a scanner with a tapered inside surface, and the pedestal has an outside surface configured to mate with the tapered inside surface of the scanner.

8. The apparatus of claim 2, wherein the cover includes an outer ring and a cap.

9. The apparatus of claim 8, wherein the outer ring is captive.

10. The apparatus of claim 9, wherein the cap includes a raised portion to accommodate manually turning the cap.

11. The apparatus of claim 1, wherein the enclosure defined by the housing is sufficiently sized to allow a cable associated with the AFM component to be stowed within the enclosure during cleaning of the AFM component.

12. The apparatus of claim 1, wherein the seal is configured to mate with the component when the component is loaded into the opening.

* * * * *